Sept. 6, 1960 H. W. THYLEFORS 2,951,501
REGULATING DEVICE FOR A FLOW MEDIUM
Filed Sept. 8, 1955 3 Sheets-Sheet 1
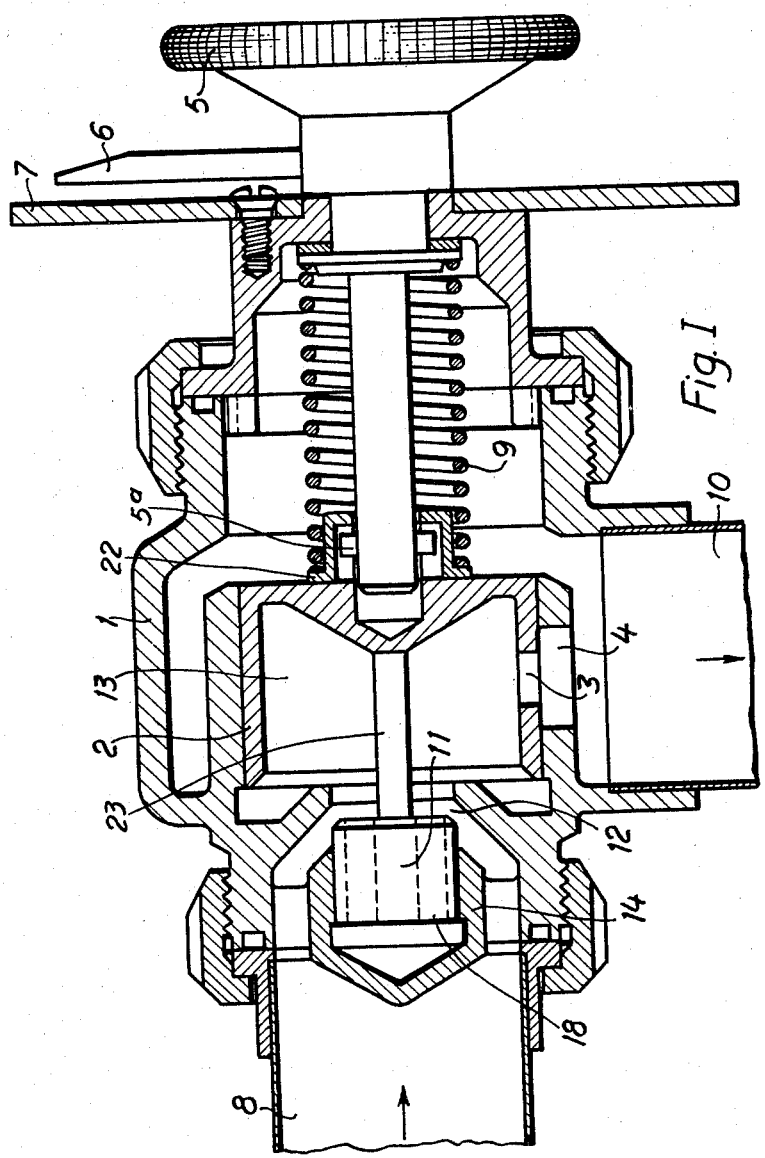
INVENTOR.
Henric Wilhelm Thylefors
BY
Davis, Hoxie & Faithfull
ATTORNEYS

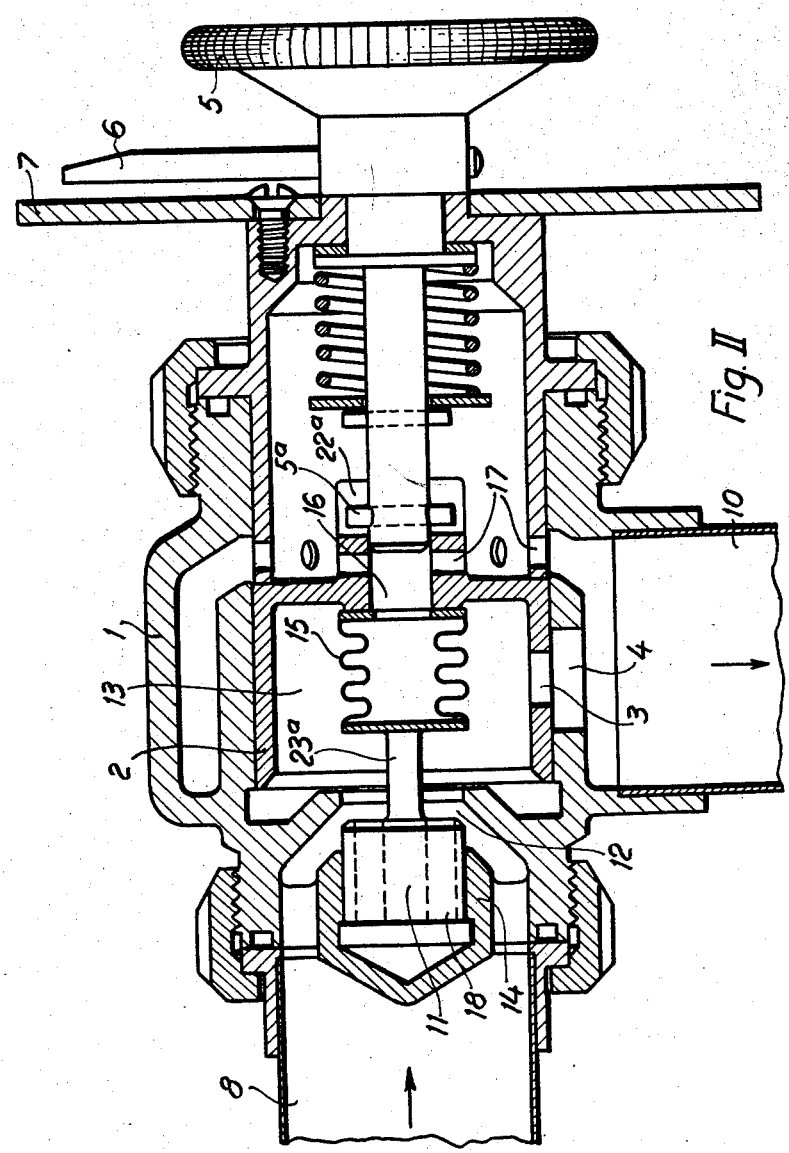

Sept. 6, 1960 H. W. THYLEFORS 2,951,501
REGULATING DEVICE FOR A FLOW MEDIUM
Filed Sept. 8, 1955 3 Sheets-Sheet 3
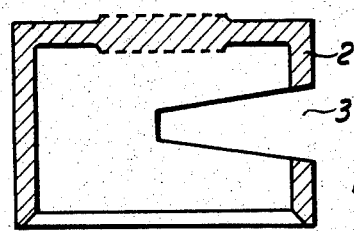
Fig. III
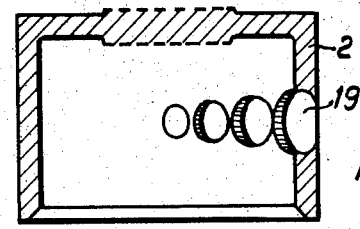
Fig. IV
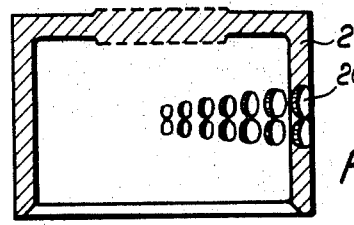
Fig. V
INVENTOR.
Henric Wilhelm Thylefors
BY
Davis, Hoxie & Faithfull
ATTORNEYS United States Patent Office 2,951,501
Patented Sept. 6, 1960

2,951,501
REGULATING DEVICE FOR A FLOW MEDIUM

Henric Wilhelm Thylefors, Stockholm, Sweden, assignor to Aktiebolaget Separator, Stockholm, Sweden, a corporation of Sweden Filed Sept. 8, 1955, Ser. No. 533,221

Claims priority, application Sweden Sept. 20, 1954

12 Claims. (Cl. 137—501)

This invention relates to flow-regulating devices and has particular reference to an improved device of this character which automatically maintains a substantially constant flow rate through the device in spite of pressure variations at the inlet and outlet of the device.

In order to pre-set an adjusting means in a flow regulating device for a certain throughflow rate, as in a centrifugal separator, a so-called flow meter is used in certain cases. This consists of a variable flow resistance (throttling means) located, for instance, in the inlet of a centrifugal separator. At a certain throughflow rate of the flow medium, a certain flow resistance corresponds to a certain pressure drop. Therefore, by maintaining a certain pressure drop through the device, it is possible to grade or scale an adjusting means, for instance, in liters per hour, although in reality it is the resistance that is varied by the adjusting means.

In machines where such a regulating device is used, the pressure at the outlet of the regulating device is usually atmospheric. Consequently, it is sufficient in these cases to keep the pressure constant at the inlet end of the regulating device, in order to maintain the throughflow rate of the liquid at the intended value by adjusting the feed pressure of the regulating device. The control necessary to maintain this constant pressure has usually been carried out manually.

The present invention has for its principal object the provision of a flow regulator in which the work of manually keeping the pressure constant is eliminated.

According to the invention, a special throttle or valve member is located at the inlet end of the adjustable flow resistance and automatically insures that the pressure at the inlet of the flow resistance is maintained at the intended level. If the discharge pressure from the regulating device is changed, the throttle member follows the change of pressure so that the pressure drop corresponding to the desired throughflow rate is maintained by the adjustable flow resistance. The throughflow rate thus remains substantially constant and independent of pressure variations in both the inlet and the outlet of the regulating device.

A flow regulator made according to the invention comprises a housing having an inlet and an outlet for the flow medium, and two throttle or valve members arranged in series in the flow path of the medium between the inlet and outlet. One of these throttle members is influenced by the flow medium to cause a movement in the second throttle member in order to change the throttle opening of the latter. The throttle member influenced by the flow medium comprises a movable or adjustable member, such as a piston, which is arranged in the path of the flow medium against the action of a biasing force. This throttle member is provided with a lateral opening constituting one of the throttle points and co-operating with another opening in another part of the housing, so that the free throughflow area formed by these openings can be changed by relative movement between the housing and the throttle member.

For a better understanding of the invention, reference may be had to the accompanying drawings, in which:

Fig. I is a longitudinal sectional view of one form of the flow regulator having a rigid connecting means between the two throttle members for the flow medium;

Fig. II is a similar view of another form of the regulator having a resilient connecting means between the two throttle members, and Figs. III, IV and V are detail sectional views of different forms of the piston throttling member.

The flow regulating device shown in Fig. I comprises a housing 1 containing a variable flow resistance in the form of a hollow cylindrical piston 2. The cylindrical wall of this piston has a slot 3 extending partly around the piston (for example, 180°) and coacting with a hole 4 in the housing. As shown in Fig. III, the slot opening 3 tapers from one end to the other. Thus, by rotating the piston in housing 1, the effective throughflow area provided by the openings 3—4 can be varied. The piston 2 is adjustable angularly by a hand-wheel 5 rotatably mounted on the housing. This adjusting member 5 has a central shaft provided at its inner end with a transverse pin 5a, the ends of which are located in longitudinal grooves in a fixture 22 on the adjacent closed end of the piston 2. Thus, the piston 2 is movable axially relative to the adjusting member 5, in addition to being rotatable by this member. A pointer 6 on adjusting wheel 5 indicates on a stationary scale 7 the rate of flow through the regulating device. In order for the scale 7 to indicate this flow rate (for example in liters per hour), it is necessary that the pressure drop through slot opening 3 and hole 4 be kept constant, in other words, that the difference between the pressures at the inlet and outlet sides of the piston 2 be kept constant.

In the Fig. I form of the invention, this constancy is maintained by means which will now be described. The inlet side of piston 2 (its open end) is loaded in one direction by the feed pressure in the opposing inlet 8 of the device, this feed pressure being reduced a little by the throttling effect of the parts between inlet 8 and piston 2. The other side of the piston 2 is loaded in the opposite direction by a biasing means in the form of a compression spring 9 coiled around the shaft of wheel 5 and also by the pressure of the liquid flow medium at the outlet 10 of the device, since this outlet is in direct communication with the housing interior at the closed end of piston 2. A second throttle or valve member, in the form of a piston 11, is located at the inlet side of piston 2 and is rigidly connected thereto so to partake of its movements. The regulating piston 11 throttles the flow through an annular space 12 located between inlet 8 and piston 2 and constituting a second throttle point of the regulating device. The piston 11 is movable axially and rotatably in a guiding cylinder 14, the latter being closed at the end facing inlet 8 but open at the end facing piston 2. To prevent forces which would disturb the regulating movements of piston 11 in cylinder 14, the piston 11 has holes 13 bored through it parallel to the piston axis, thereby equalizing the pressures at the ends of this piston.

In the operation of the device, the difference in the liquid pressures on the two sides of piston 2 are balanced by spring 9. In other words, the force which spring 9 exerts, divided by the cross-sectional area of piston 2, corresponds to the desired pressure drop through slot opening 3 and hole 4. Assume now that the difference between the pressures at inlet 8 and outlet 10 changes so as to increase the flow rate through the regulating device. This immediately causes a greater pressure drop through slot 3 and hole 4, thereby upsetting the balance of forces on piston 2 and displacing the latter axially against spring 9 until the balance is restored. This movement of piston 2 also moves the second piston or throttle 11 so as to reduce the throughflow area at the second throttle point 12 at the inlet side of piston 2. As a result, the liquid pressure is reduced within the chamber 13 of piston 2. If the spring 9 has a small spring constant so that its force is only slightly increased by its compression during the small movement of piston 2, the desired pressure difference on both sides of piston 2 is restored when the piston movement ceases. The pressure drop, and thus the flow rate through slot 3 and hole 4, has thus recovered the value previously set by means of the adjusting member 5. If the relative pressures at the inlet 8 and outlet 10 change so as to decrease the flow rate through the device, the piston 2 is moved in the opposite direction by spring 9, thereby moving the other piston 11 so as to increase the throughflow area at throttle point 12.

The regulator shown in Fig. II is generally similar to that previously described, except that the piston 2a does not move axially but contains an expansible and contractible bellows 15 connected to the closed end of this piston around an opening 16, which communicates with discharge pipe 10 through passage 17 in the piston 2a and housing 1; and the biasing spring 9 for the piston is omitted. Thus, the interior of bellows 15 is subjected to the pressure existing at the outlet side of slot 3 and hole 4, while the exterior of the bellows is subjected to the pressure at the inlet side of slot 3 and hole 4. The bellows 15 may be of the usual type having two end discs joined by a cylindrical elastic wall which is corrugated in longitudinal section, as shown.

Referring to Fig. II, assume again that the difference of pressures at inlet 8 and outlet 10 increases, so that a larger quantity of liquid flows through the slot 3 and the hole 4 per unit of time. This immediately causes an increased pressure drop through this opening 3—4, that is, an increased pressure difference between the two sides of the piston 2a. Accordingly, the bellows 15 is contracted against its inherent spring action and the pressure within the bellows; and the resulting movement of the outer or closed end of the bellows moves piston 11 so as to reduce the throughflow area of throttle point 12, because of the rigid connection between bellows 15 and piston 11. Thus, the pressure of the in-flowing medium is throttled so that the pressure in the chamber 13 within the piston 2a will be lowered relative to that in the inlet 8. If the bellows 15 has a small spring constant, the difference in pressures at the outside and inside of the bellows (i.e., the pressure drop through the slot 3 and the hole 4) returns to nearly the same value as that existing before the pressure balance was altered, due to the movement of the bellows. The quantity of liquid flowing through the regulating device per unit of time thus remains practically constant. If the pressure difference between the inlet 8 and the outlet 10 should be changed in the opposite direction, the movements of the bellows 15 and the regulating piston 11 occur in the reverse direction, whereby the throughflow area at throttle point 12 increases and the pressure drop through the slot 3 and the hole 4 is rapidly restored.

In Figs. IV and V, I have shown modifications of the throttling slot 3 of the piston 2 (or 2a). As shown in Fig. 4, this piston has a series of holes 19 which are arranged adjacent each other and with increasing diameter; and in Fig. 5 the holes 20 in the piston are arranged side by side so as to form a conical figure.

It will be apparent from the foregoing that I have provided a throttle member 2 or 2a movable relative to the housing 1 and having a lateral opening 3 forming with the housing opening 4 a throttle point leading toward the outlet 10 and variable as to throughflow area by movement of throttle 2 or 2a relative to the housing. This throttle member 2 or 2a includes a part (the piston 2 in Fig. I and the bellows 15 in Fig. II) which is biased against the pressure at the inlet side of the throttle member and is movable in response to variations in the pressure drop through throttle point 3—4. An operative connection 23 in Fig. I and 23a in Fig. II is provided between this biased part and the second throttle 11, whereby the latter partakes of the movement of this biased part to vary the throughflow area at the second throttle point 12.

I claim:

1. A flow regulating device comprising a housing having an inlet and an outlet for the flow medium to be regulated, a throttle member in the form of a hollow piston disposed in the path of the flow medium between said inlet and outlet and movable relative to the housing, the housing having an opening and the throttle member having a lateral opening forming with said first opening a first throttle point leading towards said outlet and variable as to throughflow area by rotary movement of the throttle member relative to the housing, the throttle member including a part providing a pressure surface area upstream from and an opposing pressure surface area downstream from said first throttle point, said part being supported by the throttle member for movement in a different direction than said first movement and in response to variations in the pressure drop through said first throttle point, a second throttle member disposed in said flow path and forming a second throttle point in series with said first throttle point, an operative connection between the second throttle member and said part of the first throttle member, whereby said second member partakes of said movement of said part in said different direction to vary the throughflow area at the second throttle point, an adjusting member operatively connected to the first throttle member for moving it to vary the throughflow area at the first throttle point, and a scale and a coacting pointer, one of which is secured to the housing and the other of which is secured to the adjusting member.

2. A device according to claim 1, in which the piston is non-displaceable in its axial direction.

3. A device according to claim 1, in which said second throttle member is a piston located at the inlet side of the first throttle member.

4. A device according to claim 1, in which said second throttle member is a piston located at the inlet side of the first throttle member, the device comprising also a cylinder opening at one end toward the second throttle point and in which the said second throttle member is movable.

5. A device according to claim 1, in which said second throttle member is a piston located at the inlet side of the first throttle member, the first throttle member being movable axially in the housing, said piston of the first throttle member forming said part of the first throttle member and being directly connected to the other piston.

6. A device according to claim 1, in which said part of the first throttle member is a bellows.

7. A device according to claim 1, in which said part of the first throttle member is a bellows, said bellows including two end discs joined by a cylindrical elastic wall which is corrugated.

8. A device according to claim 1, in which said part of the first throttle member is a bellows, the interior of the bellows communicating through the first throttle member with the outlet independently of said first throttle point.

9. A device according to claim 1, in which said part of the first throttle member is a bellows, the interior of the bellows communicating through the first throttle member with the outlet independently of said first throttle point, the outside of the bellows being subjected to the pressure at the inlet side of said first throttle point.

10. A device according to claim 1, comprising also a spring biasing said part of the first throttle member.

11. A device according to claim 1, in which said second throttle member is a piston located at the inlet side of the first throttle member, the device comprising also a cylinder opening at one end toward the second throttle point and in which the said second throttle member is movable, said cylinder being located at the inlet side of the second throttling point and being closed at the end thereof opposite said one end, said closed end of the cylinder being vented to equalize the pressures at the ends of said second throttle member.

12. A device according to claim 1, in which said part of the first throttle member is rotatable by rotation of said piston, the second throttle member being rotatable with said piston through said operative connection.

References Cited in the file of this patent

UNITED STATES PATENTS

| | | |
|---|---|---|
| 396,257 | Bell | Jan. 15, 1889 |
| 751,096 | Nethery | Feb. 2, 1904 |
| 1,131,480 | David | Mar. 9, 1915 |
| 2,272,684 | Vickers | Feb. 10, 1942 |
| 2,608,209 | Bryant | Aug. 26, 1952 |
| 2,731,033 | Cable | Jan. 17, 1956 |

FOREIGN PATENTS

| | | |
|---|---|---|
| 3,974 | Great Britain | of 1889 |
| 2,524 | Great Britain | of 1891 |
| 1,082,774 | France | Jan. 3, 1955 |